(12) United States Patent
Tsang et al.

(10) Patent No.: US 9,275,026 B2
(45) Date of Patent: Mar. 1, 2016

(54) CONSTRAINED DIGITAL TEXT READER

(71) Applicant: Quillsoft Ltd., Toronto (CA)

(72) Inventors: Vivian Tsang, Toronto (CA); David Jacob, Toronto (CA); Fraser Shein, Toronto (CA)

(73) Assignee: Quillsoft Ltd., Toronto, Ontario (CA)

( * ) Notice: Subject to any disclaimer, the term of this patent is extended or adjusted under 35 U.S.C. 154(b) by 29 days.

(21) Appl. No.: 14/131,875

(22) PCT Filed: Mar. 4, 2013

(86) PCT No.: PCT/CA2013/000189
§ 371 (c)(1),
(2) Date: Jan. 9, 2014

(87) PCT Pub. No.: WO2013/131171
PCT Pub. Date: Sep. 12, 2013

(65) Prior Publication Data
US 2014/0143664 A1    May 22, 2014

Related U.S. Application Data (60) Provisional application No. 61/607,736, filed on Mar. 7, 2012.

(51) Int. Cl.
*G06F 17/24* (2006.01)
*G06F 9/54* (2006.01)

(52) U.S. Cl.
CPC ............... *G06F 17/24* (2013.01); *G06F 9/543* (2013.01)

(58) Field of Classification Search
CPC .................................. G06F 17/24; G06F 9/543
USPC .......................................................... 715/256
See application file for complete search history.

(56) References Cited

U.S. PATENT DOCUMENTS

| | | | |
|---|---|---|---|
| 5,442,742 A | 8/1995 | Greyson et al. | |
| 5,532,920 A * | 7/1996 | Hartrick et al. | 715/234 |
| 5,801,693 A | 9/1998 | Bailey | |
| 6,240,430 B1 | 5/2001 | Deike et al. | |
| 6,683,631 B2 * | 1/2004 | Carroll | 715/821 |
| 6,976,170 B1 | 12/2005 | Kelly | |
| 7,369,279 B2 * | 5/2008 | Van Oosterhout | 358/3.28 |
| 7,559,033 B2 * | 7/2009 | Boss et al. | 715/769 |

(Continued)

FOREIGN PATENT DOCUMENTS

WO    WO 02/084515    10/2001

*Primary Examiner* — Cesar Paula
*Assistant Examiner* — Tyler J Schallhorn
(74) *Attorney, Agent, or Firm* — Kagan Binder, PLLC (57) ABSTRACT

A text display system provides a restricted copy-and-paste operation such that only a limited percentage less than 100% of a source text can be copied. The strategy assumes that a document contains a plurality of words and sentences that a restriction can be placed upon. While it is possible to highlight any amount of text via a typical select function (e.g., mouse drag over text), depending on the number of words at the sentence, paragraph or document level, the present invention limits how much of the selected text can be copied. The system provides the user with instant feedback via visual, tactile or other means, when a selection exceeds the system-imposed limit. The restriction permits the copy-and-paste operation of key ideas from the source text, potentially for further elaboration upon in future writing, and yet discourages indiscriminant copying leading to plagiarism.

20 Claims, 4 Drawing Sheets

(56) References Cited

U.S. PATENT DOCUMENTS

| | | |
|---|---|---|
| 7,734,627 B1 | 6/2010 | Tong |
| 7,950,066 B1 * | 5/2011 | Zuili ............................. 726/33 |
| 7,954,047 B2 * | 5/2011 | Berger et al. ................ 715/220 |
| 8,112,813 B1 | 2/2012 | Goodwin et al. |
| 8,396,829 B2 * | 3/2013 | Kawai .......................... 707/608 |
| 8,499,041 B2 * | 7/2013 | Fiedorowicz et al. ........ 709/205 |
| 8,910,036 B1 * | 12/2014 | Cromwell et al. ............ 715/234 |
| 2003/0103082 A1 * | 6/2003 | Carroll .......................... 345/769 |
| 2003/0145051 A1 * | 7/2003 | Bates et al. ................... 709/204 |
| 2004/0179220 A1 * | 9/2004 | Van Oosterhout ........... 358/1.13 |
| 2006/0218492 A1 | 9/2006 | Andrade |
| 2006/0236255 A1 * | 10/2006 | Lindsay et al. ............... 715/766 |
| 2009/0319623 A1 * | 12/2009 | Srinivasan et al. ........... 709/206 |
| 2010/0122160 A1 * | 5/2010 | Chirakansakcharoen et al. ............................ 715/256 |
| 2011/0047619 A1 | 2/2011 | King et al. |
| 2011/0131175 A1 * | 6/2011 | Kawai .......................... 707/608 |

* cited by examiner

[102]

[103]

It was only after Isaac Newton's discovery of universal gravitation that weight was considered as a property of paramount interest and importance, and that the question of the changes of weight in chemical reactions became one worth asking. When in due time this question was raised, the fact became evident at once, that combustion means not loss but gain of weight. To be sure of this, it was necessary to know first the chemical and physical properties of gases, and it was just at the same time that this knowledge was developed by Priestley, Scheele and others. Lavoisier was the originator and expounder of the necessary reform. Oxygen was just discovered at that time, and Lavoisier gathered evidence from all sides that the theory of phlogiston had to be turned inside out to fit the new facts.

It was only after Isaac Newton's discovery of universal gravitation that weight was considered as a property of paramount interest and importance, and that the question of the changes of weight in chemical reactions became one worth asking. When in due time his question was raised, the fact became evident at once, that combustion means not loss but gain of weight. To be sure of this, it was necessary to know first the chemical and physical properties of gases, and it was just at the same time that this knowledge was developed by Priestley, Scheele and others. Lavoisier was the originator and expounder of the necessary reform. Oxygen was just discovered at that time, and Lavoisier gathered evidence from all sides that the theory of phlogiston had to be turned inside out to fit the new facts.

It was only after Isaac Newton's discovery of universal gravitation that weight was considered as a property of paramount interest and importance, and that the question of the changes of weight in chemical reactions became one worth [110] asking. When in due time this question was raised, the fact became evident at once, that combustion means not loss but gain of weight. To be sure of this, it was necessary to know first the chemical [109] and physical properties of gases, and it was just at the same time that this knowledge was developed by Priestley, Scheele and others. Lavoisier was the originator and expounder of the necessary reform. Oxygen was just discovered at that time, and Lavoisier gathered evidence from all sides the [108] theory of phlogiston had to be turned inside out to fit the new facts.

CONSTRAINED DIGITAL TEXT READER

RELATED APPLICATION

This application claims the benefit from International Application No. PCT/CA2013/000189, filed Mar. 4, 2013, which in turn claims the benefit of U.S. Provisional Patent Application Ser. No. 61/607,736, filed Mar. 7, 2012, which applications are incorporated herein by reference in their entireties.

FIELD OF THE INVENTION

The present invention relates generally to digital text readers, and more particularly to digital text readers adapted to reduce plagiarism.

BACKGROUND OF THE INVENTION

In all forms of computerized systems, including forms such as desktop computers, tablets, e-books and smartphones, the cut-and paste and copy-and-paste functionality has become ubiquitous for applications that support text editing. The ease of copying and pasting, however, has lead to excessive copying of copyrighted and pre-existing electronic text, often without citation. As a result, plagiarism has become a major problem, in particular, within the educational system.

The Merriam-Webster Online Dictionary defines plagiarism as:

"to steal and pass off (the ideas or words of another) as one's own: use (another's production) without crediting the source; and to commit literary theft: present as new and original an idea or product derived from an existing source."

Students regularly access reference text, in particular, on the Internet or elsewhere, and copy and paste it into their own documents. This is useful for recording reference material in one location. However, while the intent is for students to later paraphrase this material within the final document that they are writing, such as an essay, it is often the case that they simply retain much or all of the copied text. Certainly, wrapping the text within quotations and citing the source addresses one aspect of plagiarism. However, a common situation is that no citation is made and the copied text is presented as the writer's own. The ease of copy and paste is one of the culprits; another is that the student may feel that the copied text is the same as what they might have written or that it could not be written in any other way. Ultimately, schools are responsible for teaching students how to write without plagiarizing. The associated teaching practices are considered by some as arduous to implement.

Nevertheless, there are a number of technical solutions that can reduce plagiarism. Plagiarism related efforts have been primarily directed to detection. Measuring the similarity of a document with a pre-existing document is the most common method of detecting possible plagiarism. In this case, a document is compared to one or more source documents. If it is deemed similar to some source document(s) above a certain threshold, a human reader should be alerted for further investigation via manual inspection. For example, to put the notion of threshold in context, if 20% of a text is considered similar to one or more pre-existing texts, then for a document with 100 pages of content, 20 pages of it are considered "similar."

Another area related to plagiarism in reading digital content, and relevant to the current invention, is the management of the clipboard or the copy-and-paste operation. Typical modern operating systems build in a clipboard management system that allows one to transfer content from one piece of software to another via the cut- or copy-and-paste operation (typically on Microsoft® Windows systems, Ctrl-X for cut, Ctrl-C for copy, then Ctrl-V for paste) with the use of an OS-allocated intermediary memory ("clipboard") where the selected content is placed prior to the actual paste operation.

At one extreme, the capability to copy any text may be prevented altogether within the source application that displays the text. This is most common in e-book computer applications. Some websites attempt to prevent copying anything from their displayed pages. However, this does not prevent the user from manually retyping text.

Alternatively, the copy-and-paste operation may be monitored in a two-step process. A method can be designed to monitor the copy-and-paste operation triggered by a user. The second step depends on the monitoring system to manage the clipboard content. In some approaches, the paste operation has been extended to allow the content in the clipboard to be cleared, allowing one to control what can be placed on or removed from the clipboard. In contrast, other approaches focus on monitoring the content that a user has selected when a cut-and-paste operation is initiated. The system triggers an alert for a human administrator to monitor and manage the selected content for its sensitivity.

Despite the existence of the above kinds of technology, there is a need for some other technology to reduce plagiarism that is both preventative (without being excessive in terms of total blockage of copying) and not "after-the-fact." This is especially needed in the case of supporting literacy development for both emergent writers and writers with advanced skills, where access to a limited amount of text is helpful, without the need for re-typing.

For any writer who intends to reuse content from an existing source text, unless it is a case of direct quotation, it is typically the key ideas, or specialized terminology, and not how they are expressed in the source text that are intended to be reused. The writer should carefully consider the key concepts from a source text useful in their writing instead of blindly copying (or retyping) mass amounts of content for later use (and possible re-tailoring, if at all). It is recognized that while allowing copying of some limited amount of text does not eliminate plagiarism, as citation is still required, it can reduce the aspect of plagiarism involving excessive copying.

SUMMARY OF THE INVENTION

The invention provides an improved method of computerized text selection and manipulation such that the amount of text selected and then copied, contiguous or not, is restricted. Only a pre-determined proportion of the text can be selected for copying. This method constrains the extent of selection of a contiguous block or multiple noncontiguous blocks of text, based upon an ordered evaluation of a predefined set of constraint rules that may include: number of contiguous words in a block, percentage of selected text per sentence, percentage of selected text per paragraph, and percentage of selected text per document. Exceptions may be allowed for certain word combinations, such as titles and proper names (e.g., North Atlantic Treaty Organization).

The present invention also provides a method of providing the user with feedback (that might be visual, auditory, and/or haptic) when they attempt to extend text selection beyond allowable limits.

The present invention also provides a method to modify the contents of the clipboard after allowable selected text is copied such that the contents can be pasted as a single block with separation markers between initial non-contiguous segments. Such separation markers may be one or more user-definable elements, such as a carriage return or the dash character.

The invention also provides a method of modifying a digital text reader to constrain text copying, the digital text reader being a system comprising a processor running software for displaying digital text to a user, the method comprising incorporating additional software in the digital text reader to:
 (a) receive a set of rules limiting the amount of text that may be copied;
 (b) receive requests from the user to select portions of the text;
 (c) highlight the selected text in a first manner if the selected text conforms to the rules;
 (d) highlight a portion of the selected text that conforms to the rules in the first manner and provide feedback to the user if the selected text violates the rules; and
 (e) copy the text highlighted in the first manner to a computer-readable memory if the user makes a copy request.

Providing feedback to the user may comprise highlighting in a second manner selected text that is not highlighted in the first manner and may also comprise generating a sound and/or some form of haptic/tactile (e.g., buzzing) feedback.

The text highlighted in the first manner may include a plurality of noncontiguous blocks wherein the blocks are separated from each other in the copied text by separation markers.

One rule may specify a maximum number of adjacent selected words. Another rule may specify a maximum percentage of selected words per sentence. Another rule may specify a maximum percentage of selected words per paragraph. Another rule may specify a maximum percentage of selected words per document.

The processor may run an operating system that provides a clipboard and the computer-readable memory in which the copied text is placed may be the clipboard.

A portion of the selected text highlighted in the first manner may be deselected by the user and the highlighting removed.

The invention also provides a browser plug-in comprising software adapted to modify the operation of the browser by:
 (a) receiving a set of rules limiting the amount of text that may be copied;
 (b) receiving requests from the user to select portions of the text;
 (c) if the selected text conforms to the rules, highlighting the selected text in a first manner;
 (d) if the selected text violates the rules, highlighting a portion of the selected text that conforms to the rules in the first manner and providing feedback to the user; and
 (e) if the user makes a copy request, copying the text highlighted in the first manner to a computer-readable memory.

The invention also provides a digital text reader comprising software for running on a processor for displaying portions of digital text from a document to a user, and providing a mechanism for users to select portions of the displayed text, the improvement comprising the incorporation of additional software to:
 (a) receive a set of rules limiting the amount of text that may be copied;
 (b) receive requests from the user to select portions of the text;
 (c) highlight the selected text in a first manner if the selected text conforms to the rules;
 (d) highlight a portion of the selected text that conforms to the rules in the first manner and provide feedback to the user if the selected text violates the rules; and
 (e) copy the text highlighted in the first manner to a computer-readable memory if the user makes a copy request.

The invention also provides a non-volatile computer-readable memory on which is stored the plug-in, and a non-volatile computer-readable memory on which is stored the additional software.

Ideally, the present invention captures the selection operation within any computerized text presentation system, such as an Internet browser, an e-book reader (or "e-reader"), or any application that displays source text not belonging to the user. This includes applications that present text originating from a protected source in a secondary document (e.g., for review purposes only) that retains digital copy protection such that complete copying to a destination editable document is not allowed. With the prerequisite that the text presentation system allows a user access to the text content, the present invention manages what can be copied to another application (e.g., a word processor) for the duration of the text presentation system session.

In the present invention the user is allowed to perform multiple non-contiguous sub-selections, while an ordered evaluation of a predefined set of constraint rules constrains selections, and such constraints are immediately apparent to the user through various feedback mechanisms. Here, the computer is used to discourage the user from copying indiscriminately, and to encourage intentional thoughtful selections by assisting the user with immediate feedback through a selection constraint mechanism.

Once allowable selections are made, the user can then perform a copy operation of all selections with a single action. The user can then paste the contents of the clipboard into their personal document space. To reduce confusion between distinct words/phrases once pasted, individual sub-selections are separated by some user-definable indicator, such as a carriage return or the dash character.

The above as well as additional objects, features, and advantages of the present invention will become apparent in the following detailed written description.

DETAILED DESCRIPTION OF THE INVENTION

In some embodiments, the present invention's text selection and constraint mechanism is added to an existing application, such as an Internet web browser or e-book reader, as a software "plug-in". Web browsers such as Internet Explorer and Mozilla Firefox generally support the incorporation of "plug-ins" to expand the functionality of the browser. A plug-in is implemented in software that runs on the same computer processor, as does the browser.

In other embodiments, the present invention's text selection and constraint mechanism is programmed directly within a digital text reader, such as a web browser or e-book reader. In these embodiments, the invention comprises an improved digital text reader that incorporates the text selection and constraint mechanism described herein.

In other embodiments, the present invention's text selection and constraint mechanism is programmed within a separate application that displays source text content originating from, for example, an Internet web browser or e-book reader, from which only constrained copy-and-paste is allowed.

The text selection and constraint mechanism works in conjunction with mechanisms to select multiple noncontiguous portions of text displayed by a digital text reader. Mechanisms for performing multiple noncontiguous selections are well known and are provided by some existing digital text readers. In a plug-in embodiment for a digital text reader that does not support selection of multiple noncontiguous portions of displayed text, the plug-in may provide this functionality.

With the source text content in view as displayed by the digital text reader, the user begins to select text with one of the selection mechanisms provided by the digital text reader (e.g., keyboard, mouse, finger, speech, or remote gesture). Text is highlighted as per the mechanism employed as the user moves over the text. The selection may or may not require the use of a secondary action, such as holding down a CTRL or ALT key, while making a selection.

At the point in time that the system first detects that the user begins selection, the source text is examined to count the number of words in the current sentence, paragraph, and possibly the entire document. In some instances, the total number of words in the entire document may be pre-calculated when the source document is first opened. These counts are held in a temporary memory buffer and used within an ordered evaluation of a predefined set of constraint rules that constrain selections.

Internal counters associated with the number of selected adjacent words, number of selected words per sentence, number of selected words per paragraph, and number of selected words per document are reset to zero at this time of initial selection.

As the user extends their selection past a word boundary, as defined by a word delimiter, such as a space or punctuation character, the internal adjacent word counter is incremented by one. If the user moves backwards over an already selected word delimiter, the internal adjacent word counter is decremented by one.

At the same time the internal adjacent word counter is incremented the system performs a calculation with each of the constraint rules. If system detects that one or more of the constraint rules is reached, selection highlighting ceases and the user is provided with feedback that further selection is not allowed, and such feedback may also include an indication of which rule is being violated.

A variety of feedback, such as a second highlighting method using text effects or visual effects, may potentially be employed, for example, by changing the text color or underlining the text. An auditory warning may also be employed, as may haptic/tactile feedback. For example, a buzzing sensation may be generated, if an appropriate haptic/tactile pointing device is available. The intent is that feedback is immediate and informative such the user can make an immediate judgment and have an understanding of what they are doing. When the user releases/stops their active selection, all feedback ceases and any visual effects are eliminated, leaving only the original allowable selection highlighted.

For explanatory purposes and referenced in FIGS. 1-4, consider the following set of constraint rules as an example:

(a) Maximum number of selected adjacent words=3;
(b) Maximum percentage of selected words per sentence=50% for sentences of 6 words or less;
(c) Maximum percentage of selected words per sentence=25% for sentences of 7 words or more;
(d) Maximum percentage of selected words per paragraph=15%;
(e) Maximum percentage of selected words per document=10%; and
(f) Selection of proper names greater than 3 words is allowed.

In any implementation of the methods described herein, the actual limits imposed by the system may be adjusted to account for different perspectives on what is permitted by providing a different rule set. The specific numbers as provided above are merely illustrative.

Given the multiple constraints operating at different scopes (e.g., at the sentence, paragraph, or document level), the precedence of a rule is in the descending order of restrictions, i.e., the rule that imposes the strictest restriction comes first. By way of the above example set of rules, the order would be document, paragraph, sentence and adjacent words.

Figure 1:
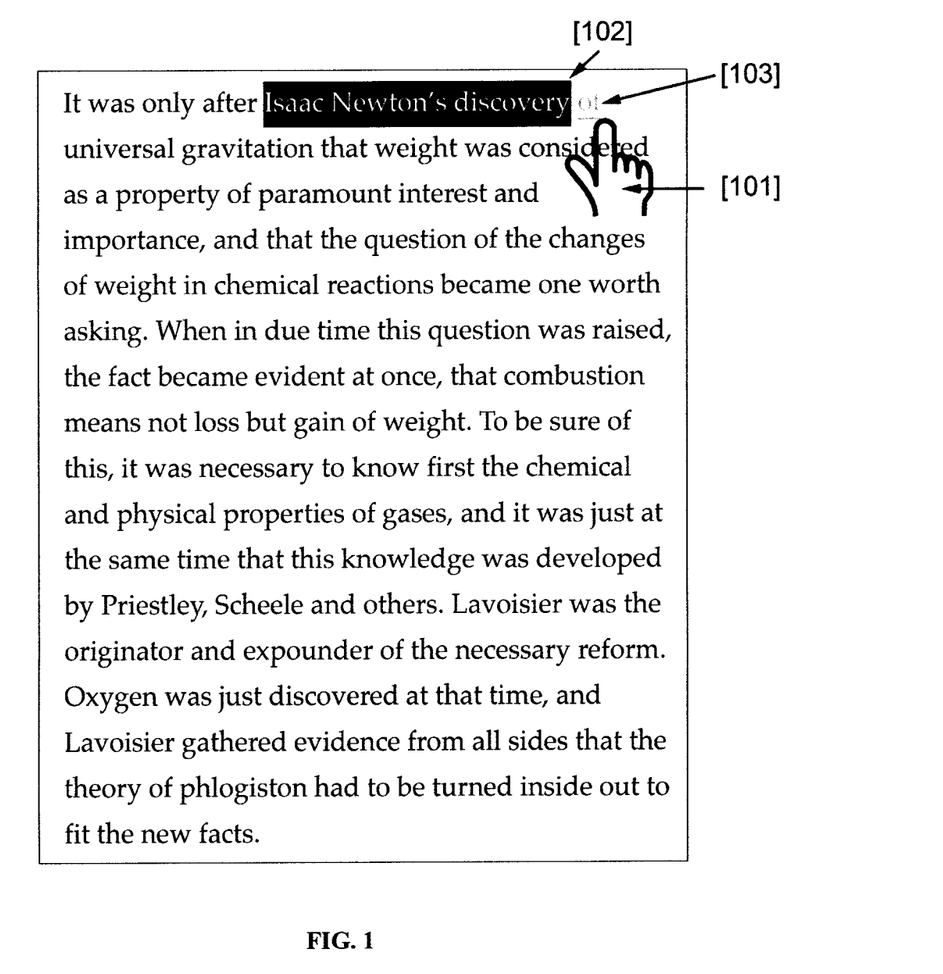
FIG. 1 illustrates a restriction placed on the selection of more than a maximum number of adjacent or contiguous words with corresponding user feedback.

For example, FIG. 1 illustrates source text displayed by a digital text reader at one time on the computer screen that shows the user attempting to select more than three adjacent words [101]. Three words are highlighted in a first manner, which is the normal method of indicating selected text used by the digital text reader and may be referred to as selection highlighting.

The first manner of highlighting stops at the end of the third word [102] as the rule of a maximum of three adjacent words was exceeded. To provide feedback to the user that the selected text violates the rules, the adjacent word that the user is attempting to select may be highlighted in a second manner, such as by being shown with some text effect [103], such as a different text color or an underline, to indicate that the maximum number of adjacent words is exceeded. No other rules are applicable as this is the first selection. When the user releases/stops their active selection, all feedback ceases and any visual effects are eliminated, leaving only the original allowable selection highlighted in the first manner [102]. In addition to providing feedback by temporarily applying a second manner of highlighting to a portion of the selected text (i.e. text the user was attempting to select) that was not highlighted in the first manner (because the selected text violated the rules), the user may also be provided with auditory, haptic and/or other visual feedback.

In the case of speech recognition or other non-contact computer input technology being used to select text by way of specifying a range of text (e.g. "Select word-1 to word-5" or "Select word-A to word-E"), only the first allowable words within that range will be highlighted while similar feedback is momentarily provided as described above.

Figure 2:
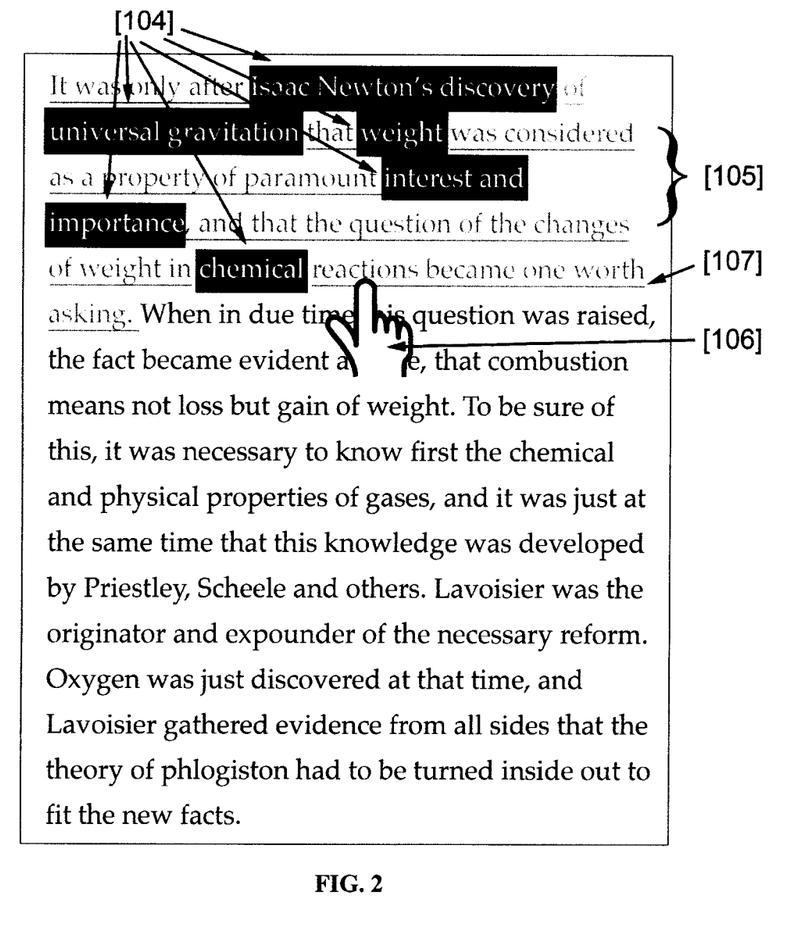
FIG. 2 illustrates a restriction placed on the selection of more than a maximum number of words across multiple non-contiguous selections within a sentence with corresponding user feedback.

FIG. 2 illustrates the situation where the user has already selected six noncontiguous word segments for a total of 10 words [104] in one sentence of 38 words [105] and is attempting to select another word [106] in that sentence. At this point, the maximum of 25% of words per sentence or ten words in this sentence (25% of 38 words) has already been reached. Therefore, any attempt to further select words within this sentence violates the sentence-level maximum rule. Here, the user is presented with feedback at the sentence level [107], such as all non-selected words shown in a different text color and/or underlining (being a second manner of highlighting). Again, when the user releases/stops their active selection, all feedback ceases and any visual effects are eliminated, leaving only the original allowable selection highlighted in the first manner [104].

Figure 3:
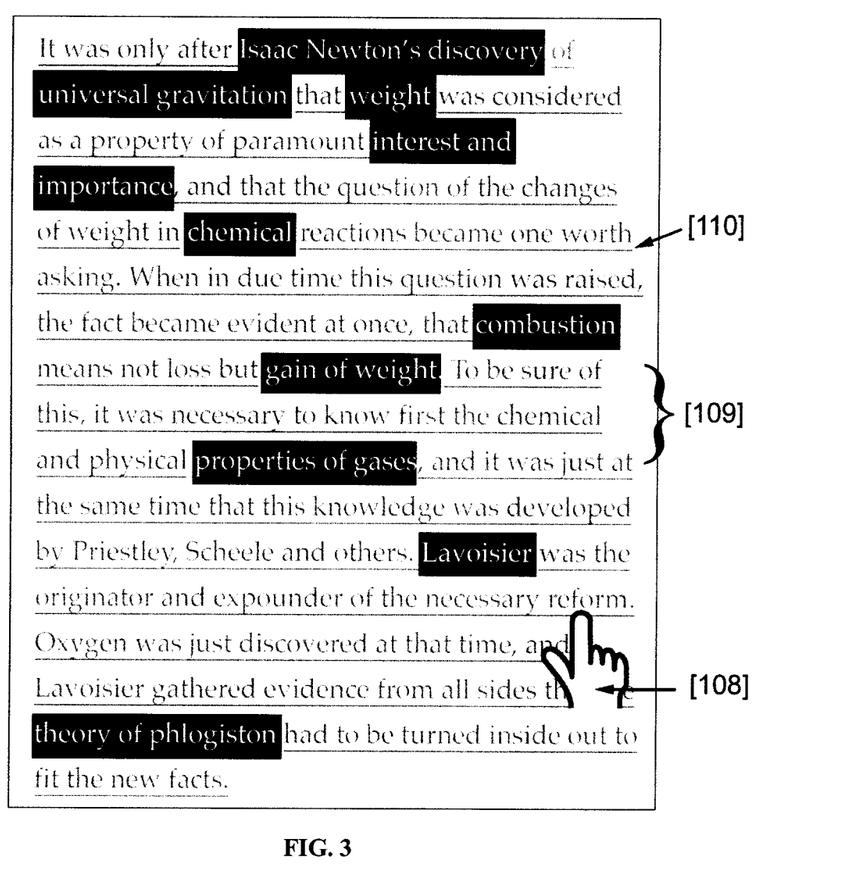
FIG. 3 illustrates a restriction placed on the selection of more than a maximum number of words across multiple non-contiguous selections within a paragraph with corresponding user feedback.

As another example, FIG. 3 illustrates the situation where the user has already made multiple noncontiguous selections within a paragraph [108] and is attempting to select another word [109] in that paragraph of 137 words. At this point, the maximum number of 21 words in this paragraph (15% of 137 words) has already been reached. Therefore, any attempt to further select words within this sentence violates the paragraph-level maximum rule. Here, the user would be presented with feedback at the paragraph level [110], such as all non-selected words being shown in a different text color and/or underlining (being a second manner of highlighting). Again, when the user releases/stops their active selection all feedback ceases and any visual effects are eliminated, leaving only the original allowable selection highlighted [108].

The user may clear any current selections highlighted in the first manner by de-highlighting them by going over them with the same actions used to make a selection in the first place or any deselect mechanism at their disposal (e.g., single click, swiping the selection).

After the user has completed making all of their desired and allowable selections they may then choose a copy command, as per available user interface procedures. The digital text reader processor generally runs an operating system, such as Microsoft Windows, that may provide a "clipboard" mechanism. A clipboard is computer readable memory accessible to the processor (typically a portion of RAM). The execution of a copy command typically places the selected text that is highlighted in the first manner into the clipboard. The user can then paste this text into other applications.

Figure 4:
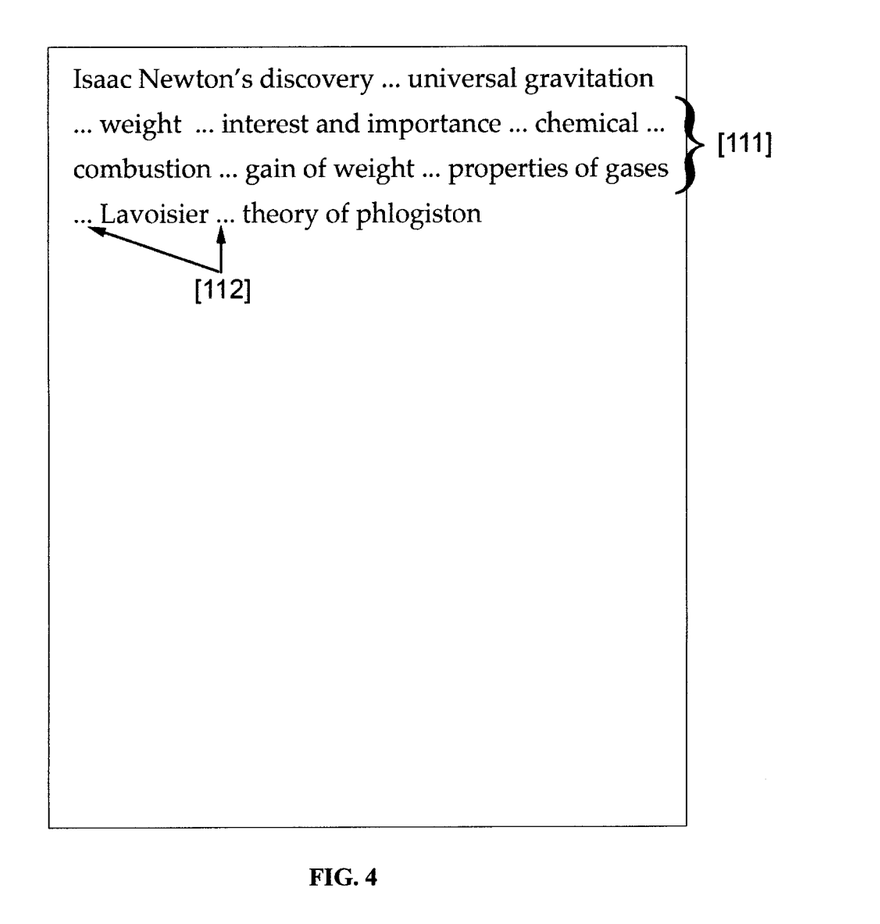
FIG. 4 illustrates the resulting copied text with delimiters placed between any initial noncontiguous segments.

FIG. 4 illustrates the results of pasting the noncontiguous selections made by the user as an example in FIG. 3. The copied contents (selected text) are pasted as a single unit [111] with added separation markers [112] between any initially noncontiguous segments or blocks (being a sequence of characters that were contiguous in the source document). Such separation markers may be one or more user-definable elements, such as carriage returns, tab characters, or ellipsis marks (such as " . . . ").

In typical embodiments, the invention employs a user interface module wherein parameters are defined for each of the constraint rules (maximum number of adjacent words, words per sentence, words per paragraph, and words per document); selection segment delimiters; and user feedback style. Otherwise, set parameters are programmed directly into the system. The invention, whether implemented as a plug-in or as part of a digital text reader typically includes the following.

- Capturing the input stream of the keyboard and/or pointing device input and/or other such device/system, including speech recognition, which might be used to select the beginning and end extent of a segment of text, as well as to initiate a copy operation.
- Controlling the clipboard such that a copy command copies each of the selected segments or blocks of text (contiguous and noncontiguous) and separates distinct segments with a pre-defined delimiter (e.g., dash, ellipses).
- An underlying text-object representation of the digital text being displayed that can be read by the present system.
- Interaction with the underlying text, to the extent that, at the minimum, the sentence and the paragraph of the text, to calculate number of words per block of text (i.e., sentence, paragraph, document).
- Interaction with the underlying text to select allowable words, by highlighting such words, in contiguous and noncontiguous segments.
- Maintaining in memory, a buffer of the total word counts, a buffer of the ongoing selected adjacent words, a buffer of the ongoing selected words, a set of rules to calculate allowable text selections, software code to provide feedback to the user as per allowable and non-allowable selections, and software code to perform the copy operation.

A digital text reader as used herein is any device that can be used to facilitate the reading of digital text by a user. Digital text is generally a sequence of characters encoded digitally (e.g. using Unicode or ASCII) that may include sequences of words forming sentences and sequences of sentences forming paragraphs or sections. Words and sentences are generally delimited by punctuation marks and spaces. Paragraphs and sections are generally delimited by special markers. Digital text is generally stored in the form of data files in a computer readable memory which may also contain formatting information expressed in a markup language. A digital text reader generally includes a programmable processor running software, computer readable memory for storing digital text, and a display device or screen, where the software is adapted to display portions of files selected by the user on the screen. A common form of digital text reader is a PC or portable computing device running an operating system and a web browser such as Google Chrome or Mozilla Firefox. A computing device running various programs, such as a text editor, a word processor, or a document viewer (such as a PDF reader) also constitutes a digital text reader, as do special purpose devices such as e-book readers.

Generally, a computer, computer system, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Computer-readable memory, which may also be referred to as a computer-readable medium or a computer-readable storage medium, which terms have identical meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that references to computer-readable memory exclude transitory propagating signals. Memory may be distributed such that at least two components are remote from one another, but are still all accessible by one or more processors. A nonvolatile computer-readable memory refers to a computer-readable memory that can retain information stored in the memory when it is not powered. A computer-readable memory is a physical, tangible object that is a composition of matter, and it cannot be construed as an "activity" of any nature whatsoever. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to the processors to cause the processors to perform computations, control other devices, receive input, send output, etc.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", or is prefaced or followed by the expression "for example", or "e.g.", this is done to expressly convey and emphasize that the list is not exhaustive, irrespective of the length of the list. The absence of such an expression, or other similar expressions, is in no way intended to imply that a list is exhaustive. Unless otherwise expressly stated, such lists shall be read to include all comparable or equivalent variations of the items, and alternatives to the items, in the list that a skilled person would understand would be suitable for the purpose that the items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A method of modifying a digital text reader to constrain text copying, the digital text reader being a system comprising a processor running software for displaying digital text to a user, the method comprising incorporating additional software in the digital text reader to:
    (a) receive a set of rules limiting the amount of text in a document that may be copied, the amount of text being specified by a function of one or more of: (i) a maximum total number of words; (ii) a maximum percentage of words in a sentence for sentences having at least a specified length; (iii) a maximum percentage of words in a paragraph; and (iv) a maximum percentage of words in the document;
    (b) receive requests from the user to select portions of the text that is being displayed, the selected text comprising a plurality of noncontiguous blocks;
    (c) if the selected text conforms to the rules, then in response to the selection of the selected text automatically highlight the selected text in a first manner;
    (d) if the selected text does not conform to the rules, then in response to the selection of the selected text, identify a sub-portion of the selected text that contains an amount of text that conforms to the rules, and automatically highlight the sub-portion of the selected text in the first manner and provide feedback to the user indicating that the selected text contains an amount of text that violates the rules; and
    (e) if the user enters a copy request, concatenate the noncontiguous blocks in the portion of the text highlighted in the first manner, automatically adding separation markers between the noncontiguous blocks, and if the user further enters a paste command, paste the concatenated blocks separated by the added separation markers to a computer-readable memory as instructed by the user.

2. The method of claim 1 wherein step (b) further comprises receiving requests from the user to deselect previously selected portions of the text and step (c) further comprises removing highlighting from previously highlighted text that is deselected.

3. The method of claim 1 wherein step (b) comprises selecting a single text character and steps (b), (c) and (d) are repeated so that the selected text conforming to the rules is highlighted as it is selected and feedback to the user is provided when the selection of an additional character causes the selected text not to conform to the rules.

4. The method of claim 1 wherein providing feedback to the user comprises highlighting in a second manner selected text that is not highlighted in the first manner.

5. The method of claim 1 wherein providing feedback to the user comprises generating a sound.

6. The method of claim 1 wherein one rule specifies a maximum number of adjacent selected words.

7. The method of claim 1 wherein one rule specifies a maximum percentage of selected words per sentence.

8. The method of claim 1 wherein one rule specifies a maximum percentage of selected words per paragraph.

9. The method of claim 1 wherein one rule specifies a maximum percentage of selected words per document.

10. The method of claim 1 wherein the processor runs an operating system that provides a clipboard and the computer-readable memory is the clipboard.

11. A text-reading system comprising:
    (a) a computer processor;
    (b) a non-transitory memory readable by the processor;
    (c) a browser comprising software stored in the memory and running on the processor;
    (d) a browser plug-in comprising software adapted to modify the operation of the browser by:
        i. receiving a set of rules limiting the amount of text in a document that may be copied, the amount of text being specified by a function of one or more of: (i) a maximum total number of words; (ii) a maximum percentage of words in a sentence for sentences having at least a specified length; (iii) a maximum percentage of words in a paragraph; and (iv) a maximum percentage of words in the document;

ii. receiving requests from the user to select portions of the text, the selected text comprising a plurality of noncontiguous blocks;

iii. if the selected text conforms to the rules, then in response to the selection of the selected text automatically highlighting the selected text in a first manner;

iv. if the selected text violates the rules, then in response to the selection of the selected text identifying a sub-portion of the selected text that contains an amount of text that conforms to the rules, and automatically highlighting the sub-portion of the selected text in the first manner and providing feedback to the user; and v. if the user makes a copy request, concatenating the noncontiguous blocks in the portion of the text highlighted in the first manner, automatically adding separation markers between the noncontiguous blocks, and if the user further enters a paste command, pasting the concatenated blocks separated by the added separation markers to a computer-readable memory as instructed by the user.

12. The system of claim 11 wherein providing feedback to the user comprises highlighting in a second manner selected text that is not highlighted in the first manner.

13. The system of claim 11 wherein providing feedback to the user comprises generating a sound.

14. The system of claim 11 wherein one rule specifies a maximum number of adjacent selected words.

15. The system of claim 11 wherein one rule specifies a maximum percentage of selected words per sentence.

16. The system of claim 11 wherein one rule specifies a maximum percentage of selected words per paragraph.

17. The system of claim 11 wherein one rule specifies a maximum percentage of selected words per document.

18. The system of claim 11 wherein the processor runs an operating system that provides a clipboard and the computer-readable memory is the clipboard.

19. The system of claim 11 wherein a portion of the selected text highlighted in the first manner may be de-selected by the user and the highlighting removed.

20. A text reader comprising a computer processor configured to:

(a) receive a set of rules limiting the amount of text in a document that may be copied, the amount of text being specified by a function of one or more of: (i) a maximum total number of words; (ii) a maximum percentage of words in a sentence for sentences having at least a specified length; (iii) a maximum percentage of words in a paragraph; and (iv) a maximum percentage of words in the document;

(b) receive requests from a user to select portions of the text, the selected text comprising a plurality of noncontiguous blocks;

(c) if the selected text conforms to the rules, then in response to the selection of the selected text highlight the selected text in a first manner;

(d) if the selected text does not conform to the rules, then in response to the selection of the selected text, identify a sub-portion of the selected text that contains an amount of text that conforms to the rules, and automatically highlight the sub-portion of the selected text in the first manner and provide feedback to the user indicating that the selected text contains an amount of text that violates the rules; and (e) if the user enters a copy request, concatenate the noncontiguous blocks in the portion of the text highlighted in the first manner, automatically adding separation markers between the noncontiguous blocks, and if the user further enters a paste command, paste the concatenated blocks separated by the added separation markers to a computer-readable memory as instructed by the user.

* * * * *